(No Model.) 2 Sheets—Sheet 1.

J. A. JUST.

CHLORINE GAS WASHER.

No. 317,796. Patented May 12, 1885.

Witnesses:
Ernest Abshagen
Clark Ennis

Inventor:
John A. Just
By his Attorney: John W. Sutton

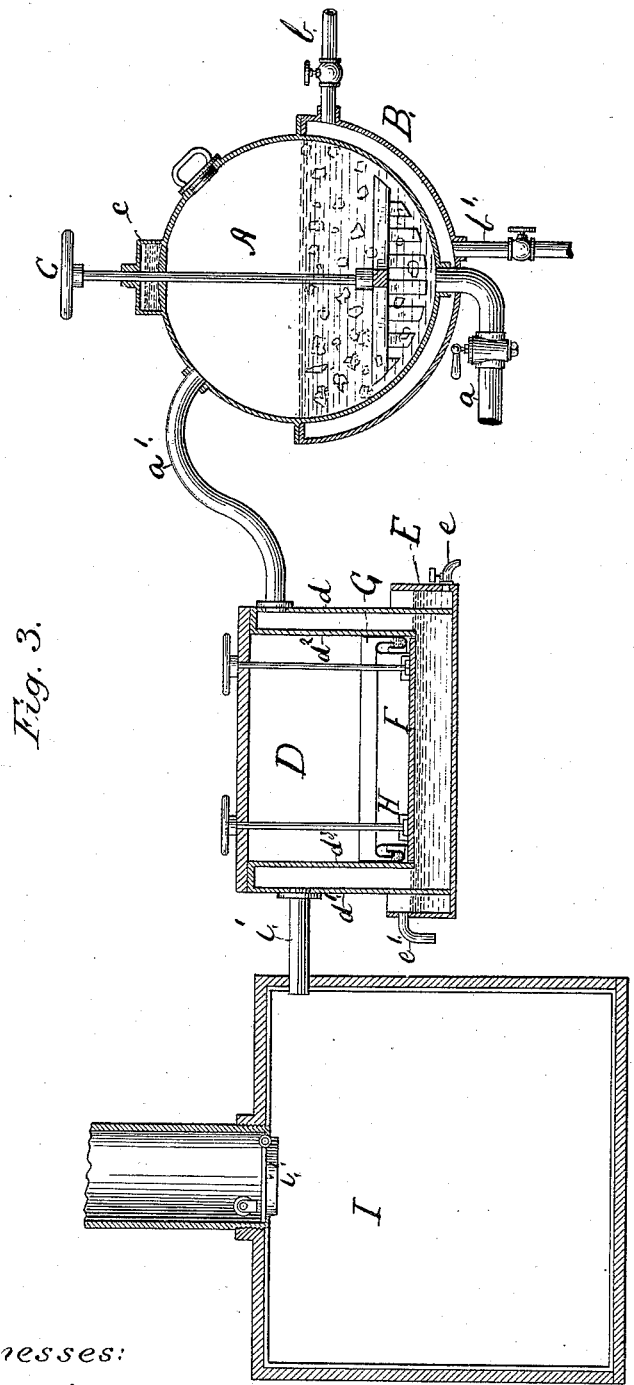

UNITED STATES PATENT OFFICE.

JOHN A. JUST, OF NEW YORK, ASSIGNOR TO HIMSELF, LEWIS F. PHILLIPS, OF WATERTOWN, AND CALLIE F. GIBBS, OF BROOKLYN, NEW YORK.

CHLORINE-GAS WASHER.

SPECIFICATION forming part of Letters Patent No. 317,796, dated May 12, 1885.

Application filed November 19, 1884. (No model.)

*To all whom it may concern:*

Be it known that I, JOHN A. JUST, a citizen of Germany, and a resident of the State, county, and city of New York, have invented a new and useful Improvement in Chlorine-Gas Washers, of which the following is a specification.

My invention relates to improvements in chlorine-gas-washing machines in which the gas is forced below the surface of the water and compelled to travel some distance so immersed, thereby separating all impurities from it quickly, surely, and cheaply in large quantities. I attain these objects by the mechanism illustrated in the accompanying drawings, in which—

Figure 1:
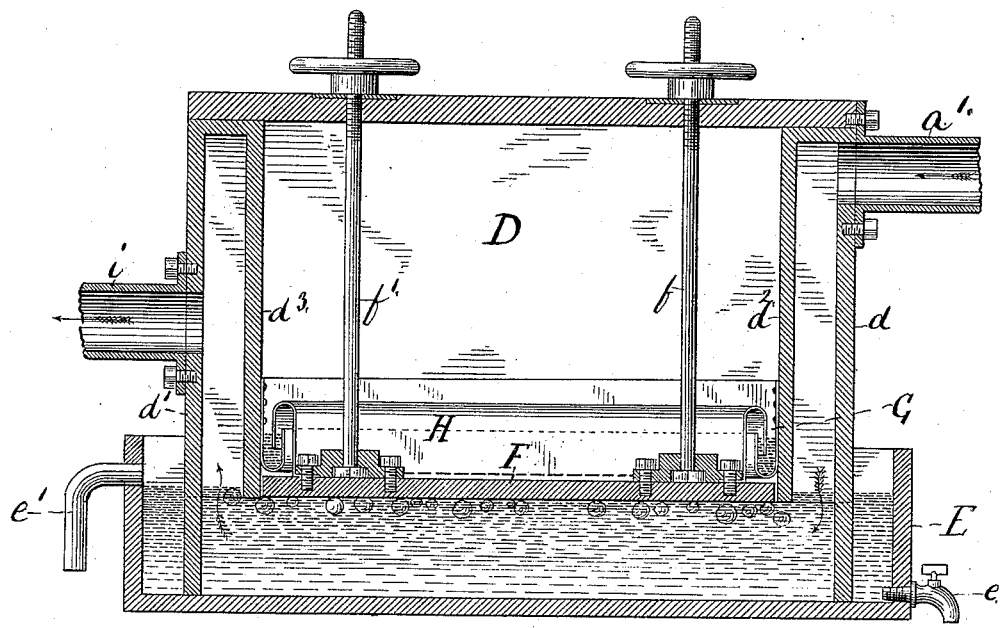
Figure 2:
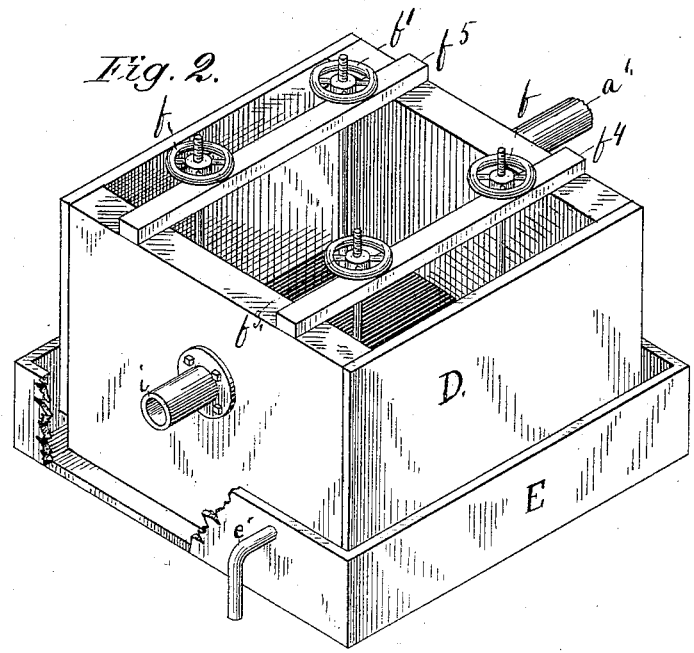

Figure 1 is a vertical sectional view of the washer. Fig. 2 is a perspective view of the same, with a part of the water-tank broken away. Fig. 3 is a vertical sectional view of the retort, washer, and absorption-chamber.

Similar letters refer to similar parts throughout the several views.

A is the retort, the lower half being set in a steam-jacket, B.

$a$ is a discharge-pipe, with cock to let off the residue after the discharge is exhausted.

$b$ is the inlet steam-pipe.

$b'$ is a pipe and valve to let off the condensed water.

C is a stirrer.

$c$ is a water-packing box.

$a'$ is the pipe that connects the retort A to the first upright chamber of the washer D.

$d$ and $d'$ are the outside end walls of the washer, the lower ends of which rest upon the bottom of the water-tank E.

$d^2$ and $d^3$ are the inner walls of the washer and extend downward to the surface of the water in the tank E. The sides of the washer extend downward about four inches below the surface of the water, as shown in Fig. 2, where the tank is broken away. The space between $d$ and $d^2$ I will call the "first upright chamber," and the space between $d'$ and $d^3$ the "second upright chamber." A top is put on each of upright chambers and they are air-tight. The washer is made of resinous wood, preferably of pitch-pine, and lined with sheet-lead on every part that is to come in contact with the chlorine gas; or it may be covered with a cement that chlorine gas will not attack.

F is a movable bottom of the washer, and is hung from the bearing-pieces $f^4$ and $f^5$, that are across the top of the washer, by four rods $f$, $f'$, $f^2$, and $f^3$. The lower ends of said rods are attached to the bottom F. The upper ends of said rods are screw-threaded, and upon each rod is a hand-wheel that is also screw-threaded, and by them the bottom F is adjusted to any depth in the water in the tank E. The bottom F fits loosely in the washer, and is made air-tight by means of a narrow trough, G, of sheet-lead that surrounds the inside of the washer and is attached thereto. A diaphragm, H, also of sheet-lead, is attached to the upper surface of the bottom F, the upper edge of which is turned down into the trough G. The depth of the trough G and the turned-down part of H is such that the bottom F may be moved up and down several inches and the lower edge of H still be immersed in the liquid within the trough G. This liquid may be water; but I prefer glycerine, as that substance does not absorb chlorine gas or any of the impurities in its manufacture. The tank E has an overflow-pipe, $e'$, that keeps the water at the same level, and a cock, $e$, to draw off the water.

I is the absorption-chamber and communicates with the washer D by the pipe $i$. $i'$ is a trap-door to allow air to enter the chamber when it is being filled or emptied. Other doors (not shown) are in the sides to enter the chamber.

To make a pure chloride or chlorate it is necessary to remove every particle of muriatic acid, and as this substance is always present in the making of chlorine gas, and as muriatic acid has a greater affinity for water than for chlorine gas, by forcing the chlorine gas into contact with water, and passing through several feet of water every particle of the gas is brought into contact with the water, and the muriatic acid leaves the chlorine gas and is taken up by the water, I pass the gas in an extremely thin sheet over the water under pressure.

The action of the apparatus is as follows: The retort A is charged with peroxide of manganese and common salt. The tank E is filled with water at a temperature of 80° to 90° Fahrenheit. The trough G is filled with glycerine and the bottom F adjusted with its lower surface about one-half an inch below the surface of the water and perfectly level. The absorption-chamber is filled with the materials that, by absorbing chlorine gas, form chlorides or chlorates. The materials are placed in shallow trays and so arranged that the gas has free access to them. The absorption-chamber is then closed air-tight. Sulphuric acid is now poured into the retort A upon the salt and manganese. Chlorine gas is now formed and passes out of the retort through the pipe $a'$ into the first upright chamber of the washer, down the chamber to the water in the tank E. The pressure of the heat evolved within the retort forces the gas down below the lower surface of the bottom F of the washer. The sides of the washer, being lower in the water than the bottom F, prevent the gas from escaping at the sides, and the gas passes across from the first upright chamber through the water to the second upright chamber. The impurities, (muriatic acid,) having a greater affinity for water than for the chlorine gas, are absorbed by the water, leaving the chlorine pure when it enters the second upright chamber and by the pipe $i$ passes into the absorption-chamber, where it is absorbed by the materials placed there for that purpose. When the action within the retort is greatest—that is, when larger quantities of gas are evolved—the bottom F is lowered deeper into the water, and when the action becomes weaker the bottom is raised. When the first action becomes weaker, steam is turned into the steam-jacket B, which intensifies the action within the retort. The heat is kept up, the material stirred by means of the stirrers C, and the bottom B is moved up and down, giving the gas more or less pressure. This pressure and the distance that the gas travels while immersed in the water insures that every particle of muriatic acid will be removed. This is kept up until the whole of the chlorine gas is given out of the mixture placed in the retort, when the steam is shut off and the whole allowed to cool down. The materials are removed from the absorption-chamber, the residue from the retort, and the water run out of the tank. Fresh water is put into the tank, a new lot of materials in the absorption-chamber, and a new charge put into the retort, and the same operation repeated.

I am aware of the United States patent in which a water-seal is described as used to form an air-tight joint between an upper and lower chamber, and am also aware that the water-seal is used in other places.

I am also aware that gas-washers have been made with a series of bent tubes, the lower ends of each tube being immersed in a separate section of a water-tank, as in the above-mentioned patent.

In my improved gas-washer the inlet and outlet chambers are of the same width as the movable bottom, and the movable bottom has a flat, smooth surface where the gas passes under it (ten or twelve feet long) and is so arranged that more or less immersion (pressure) may be given to the gas as it passes under the bottom, so that the gas shall be in a thin sheet of not over one-sixteenth of an inch in thickness, thereby insuring every particle of gas being brought into contact with the water. When the gas is being formed fast, the bottom is lowered into the water enough to keep the sheet of gas the proper thickness, and when the gas is formed slower the bottom is raised. A wide, thin sheet of gas for ten or twelve feet is produced by my device instead of a series of immersions from four to six inches. My washer is cheaper to build and work, and will wash a much larger quantity of gas in a given time, and is cleaned by simply running off the water in the tank.

Having thus described my said invention, what I claim, and desire to secure by Letters Patent of the United States, is—

1. In a chlorine-gas washer, the combination of an inlet and outlet chamber and a smooth-surfaced movable bottom, all of the same width, with means for adjusting the bottom, as and for the purpose specified.

2. In a chlorine-gas washer, the combination of an inlet and outlet chamber, a smooth-surfaced movable bottom, all of the same width, a water-seal surrounding said bottom, and means for adjusting the same with a water-tank, as and for the purpose specified.

In testimony that I claim the foregoing as my invention I have signed my name, in presence of two witnesses, this the 4th day of November, 1884.

JOHN A. JUST.

Witnesses:
JOSEPH CORBETT,
JOSEPH CORBETT, Jr.